US008434206B2

(12) United States Patent
Yu

(10) Patent No.: US 8,434,206 B2
(45) Date of Patent: May 7, 2013

(54) CLUTCHING JIG

(75) Inventor: Sheng-Nan Yu, Taipei (TW)

(73) Assignee: Cheng UEI Precision Industry Co., Ltd., Taipei (TW)

( * ) Notice: Subject to any disclaimer, the term of this patent is extended or adjusted under 35 U.S.C. 154(b) by 721 days.

(21) Appl. No.: 12/699,192

(22) Filed: Feb. 3, 2010

(65) Prior Publication Data

US 2011/0185550 A1 Aug. 4, 2011

(51) Int. Cl.
*B23Q 7/04* (2006.01)

(52) U.S. Cl.
USPC .................................. 29/283; 29/278; 29/764

(58) Field of Classification Search .................... 29/278, 29/283, 764, 269, 566, 99.1, 99.2; 81/3.8; 359/819, 809
See application file for complete search history.

(56) References Cited

U.S. PATENT DOCUMENTS

| | | | | |
|---|---|---|---|---|
| 714,989 | A * | 12/1902 | Worthington | 294/86.14 |
| 1,243,150 | A * | 10/1917 | Fox | 81/3.8 |
| 1,456,943 | A * | 5/1923 | Smith | 294/86.28 |
| 2,507,127 | A * | 5/1950 | True | 294/199 |
| 2,544,142 | A * | 3/1951 | Dritley | 294/115 |
| 2,584,853 | A * | 2/1952 | Elsey | 294/86.23 |
| 3,752,017 | A * | 8/1973 | Lloyd et al. | 81/9.44 |
| 3,981,673 | A * | 9/1976 | Sokolow | 294/115 |
| D264,300 | S * | 5/1982 | Imm | D8/28 |
| 4,904,010 | A * | 2/1990 | Lacey et al. | 294/116 |
| 6,363,596 | B1 * | 4/2002 | Reiter et al. | 29/278 |
| 6,612,634 | B1 * | 9/2003 | Zoppas | 294/106 |
| 7,359,129 | B2 * | 4/2008 | Chiu et al. | 359/809 |
| D603,434 | S * | 11/2009 | Yang et al. | D15/140 |
| D626,148 | S * | 10/2010 | Huang et al. | D15/5 |
| 7,835,090 | B1 * | 11/2010 | Yang et al. | 359/808 |
| 8,023,207 | B2 * | 9/2011 | Wang et al. | 359/809 |
| 8,033,010 | B2 * | 10/2011 | Wang et al. | 29/764 |
| 8,098,444 | B2 * | 1/2012 | Yu | 359/809 |
| 8,152,213 | B2 * | 4/2012 | Fortune | 294/99.2 |
| 8,245,377 | B2 * | 8/2012 | Ormachea et al. | 29/283 |
| 8,286,317 | B2 * | 10/2012 | Wang | 29/283 |
| 2008/0068732 | A1 * | 3/2008 | Chiu et al. | 359/809 |
| 2010/0284096 | A1 * | 11/2010 | Yang et al. | 359/809 |
| 2010/0306980 | A1 * | 12/2010 | Yang et al. | 29/278 |
| 2011/0000062 | A1 * | 1/2011 | Kolasa | 29/278 |
| 2011/0051263 | A1 * | 3/2011 | Wang et al. | 359/809 |
| 2011/0056072 | A1 * | 3/2011 | Wang et al. | 29/764 |
| 2011/0148129 | A1 * | 6/2011 | Wang | 294/86.4 |
| 2011/0173789 | A1 * | 7/2011 | Huang et al. | 29/278 |
| 2011/0255180 | A1 * | 10/2011 | Yu | 359/809 |

* cited by examiner

*Primary Examiner* — Lee D Wilson
*Assistant Examiner* — Jamal Daniel
(74) *Attorney, Agent, or Firm* — WPAT, P.C.; Anthony King

(57) ABSTRACT

A clutching jig includes a pair of clutching bars, a pair of clutching pieces and a protecting means. Each of the clutching bars includes a top end portion and a bottom end portion. The top end portions are connected to each other and the bottom end portion are separated from each other. Each of the clutching pieces is fixed to the bottom end portion of each of the clutching bars. The clutching pieces are covered by the protecting means and exposed from the protecting means via the protecting means moved relative to the clutching pieces. The protecting blocks will cover the clutching pieces if the clutching jig is unused. The protecting blocks will slide upwardly relative to the clutching bars to urge the clutching pieces to be exposed if the clutching jig is used. Hence, the protecting blocks can protect the clutching pieces to prevent the clutching pieces from damage.

16 Claims, 6 Drawing Sheets

CLUTCHING JIG

BACKGROUND OF THE INVENTION

1. Field of the Invention

The invention relates to a clutching jig, and more particularly to a clutching jig with a protecting means.

2. The Related Art

As the digital products have been diversely developed, such as personal digital assistants (PDA), mobile phones, or other small portable terminal apparatuses, each of them is broadly combined with a miniature photographing device, like lens assembly, to perform the photographing function. The lens assembly includes a lens socket and a lens module provided with the lens socket. In the process of assembly and repair, the users usually need to clutch the lens module out of the lens socket.

Please refer to FIG. 5 and FIG. 6, which shows a module assembly including a lens socket 700 and a lens module 800 received in the lens socket 700. The lens module 800 has a rectangular lens base 802 and a circular lens body 804 projected from a top surface of the lens base 802. The lens socket 700 has a cup-shaped insulating housing 702 formed a receiving space therein and a metal shell 704 enclosing the peripheral of the insulating housing 702. A top of the metal shell 704 is extended a plurality of pressing pieces 706 and towards the receiving space.

The lens module 800 is inserted into the receiving space of the insulating housing 702. The pressing pieces 706 press the top surface of the lens base 802 for retaining the lens module 800 in the lens socket 700. If the lens module 800 is damaged, the lens module 800 will be disengaged from the lens socket 700 by a clutching jig.

A conventional clutching jig 900 including a bar shaped clutching body 902. The clutching body 902 defines a first end 904, a second end 906 opposite to the first end 904, a pair of first surfaces 908 and a pair of second surfaces 910 connected to the first surfaces 908. The clutching body 902 defines a slit 912 longitudinally penetrated the first surfaces 908 and opened on the second end 906. Hence, the clutching body 902 is divided to a first clutching bar 914 and a second clutching bar 916 from the second end 906.

The second end 906 of the clutching body 902 defines a concave portion 918. The concave portion 918 is mated with the lens module 800. A through hole 920 is penetrated a middle portion of each of the second surfaces 910. A coil spring 922 is received in the through holes 920. A pair of retaining pin 924 is plugged into the through holes 920 from the second surfaces 910 respectively.

A pair of first fixing holes 926 is respectively penetrated the first surfaces 908 of second end 906 of the first clutching bar 914 and the second clutching bar 916. Four clutching pieces 928 are attached on the first surfaces 908 of second end 906 of the first clutching bar 914 and the second clutching bar 916. Each of the clutching pieces 928 defines a second fixing hole 930. Four fixing blocks 932 are mounted on the clutching pieces 928 respectively. Each of the fixing blocks 932 defines a third fixing hole 934.

A pair of fixing pins 936 are respectively fixed to the first fixing holes 926 through the third fixing holes 934 of the fixing blocks 932 and the second fixing holes 930 of the clutching pieces 928. Hence, each of the clutching pieces 928 is fixed between the second end 906 of the clutching body 902 and each of the fixing blocks 932.

The second end 906 of the clutching jig 900 is inserted into the receiving space of the lens socket 700. The lens body 804 of the lens module 800 is received in the concave portion 918 of the clutching jig 900. The pressing pieces 921 are urged to be apart from the lens module 80 and towards the inner surface of the receiving space 93 by the clutching pieces 928. Thus the lens module 80 is disengaged from the pressing pieces 921.

The clutching pieces 928 are inserted between the lens base 802 of the lens module 800 and the insulating housing 702. The first clutching bar 914 and the second clutching bar 916 of the clutching jig 900 are applied an external force from the second surfaces 910 to urge the clutching pieces 928 to clutch the lens module 800. The clutching jig 900 is pulled out from the lens socket 700 with the lens module 800.

The external force applied to the first clutching bar 914 and the second clutching bar 916 of the clutching jig 900 is released and the coil spring 922 pushes the first clutching bar 914 and the second clutching bar 916 of the clutching jig 900 outwardly. Hence, the first clutching bar 914 and the second clutching bar 916 of the clutching jig 900 are returned to the original position and the lens module 800 is released from the concave portion 918 of the clutching jig 900. According to the clutching pieces 928 being exposed, the clutching pieces 928 are easy to be damaged.

SUMMARY OF THE INVENTION

An object of the present invention is to provide a clutching jig with a protecting means.

According to the present invention, the clutching jig includes a pair of clutching bars, a pair of clutching pieces and a protecting means. Each of the clutching bars includes a top end portion and a bottom end portion opposite to the top end portion. The top end portions are connected to each other, the bottom end portions are separated from each other.

Each of the clutching pieces is fixed to the bottom end portion of each of the clutching bars. The clutching pieces are covered by the protecting means and exposed from the protecting means via the protecting means moved relative to the clutching pieces.

An object of the present invention is to provide a clutching jig with a pair of protecting blocks.

According to the present invention, the clutching jig includes a pair of clutching bars, a pair of clutching pieces and the protecting blocks. Each of the clutching bars is of an elongate shape and defines an inner surface, an outer surface opposite to the inner surface, a pair of lateral surfaces, a top end portion and a bottom end portion opposite to the top end portion.

The inner surfaces of the clutching bars are faced to each other. The top end portions of the clutching bars are connected to each other. The bottom end portions of the clutching bars are separated from each other. Each of the clutching pieces is connected to the bottom end portion of each of the clutching bars. Each of the protecting blocks covers on each of the clutching pieces. The clutching pieces are exposed from the protecting blocks via the protecting blocks sliding relative to the clutching pieces along a longitudinal direction of the clutching bars.

As described above, the protecting blocks will cover the clutching pieces if the clutching jig is unused. The protecting blocks will slide upwardly relative to the clutching bars to urge the clutching pieces to be exposed if the clutching jig is used to disassemble a lens assembly. Hence, the protecting blocks can protect the clutching pieces and prevent the clutching pieces from damage.

BRIEF DESCRIPTION OF THE DRAWINGS

The present invention will be apparent to those skilled in the art by reading the following description thereof, with reference to the attached drawings, in which.

DETAILED DESCRIPTION OF THE PREFERRED EMBODIMENT

Figure 1:
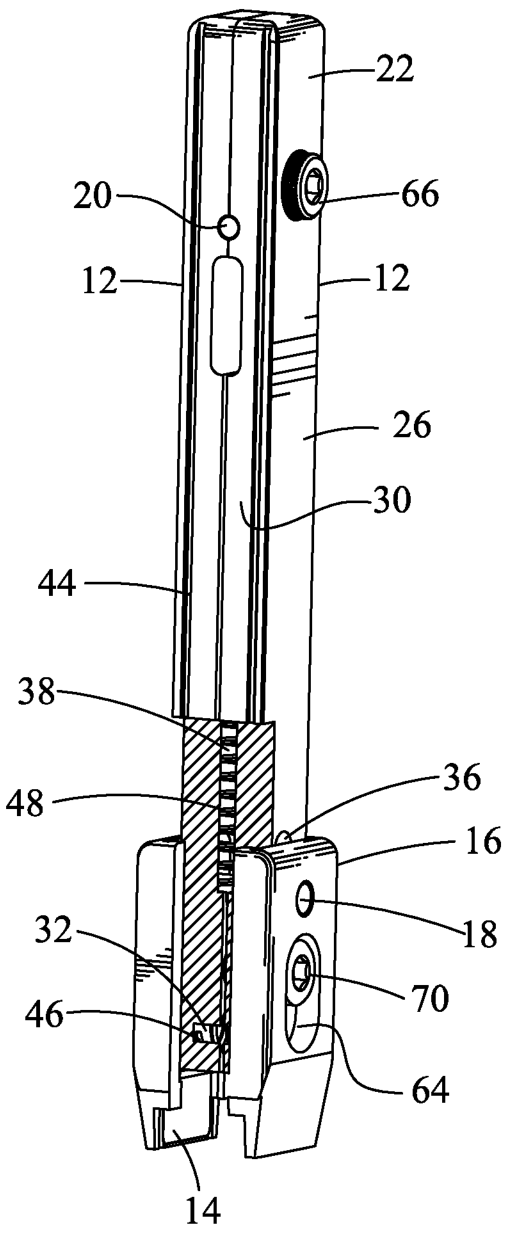
FIG. 1 is a perspective view of a clutching jig of a preferred embodiment according to the present invention.
Figure 2:
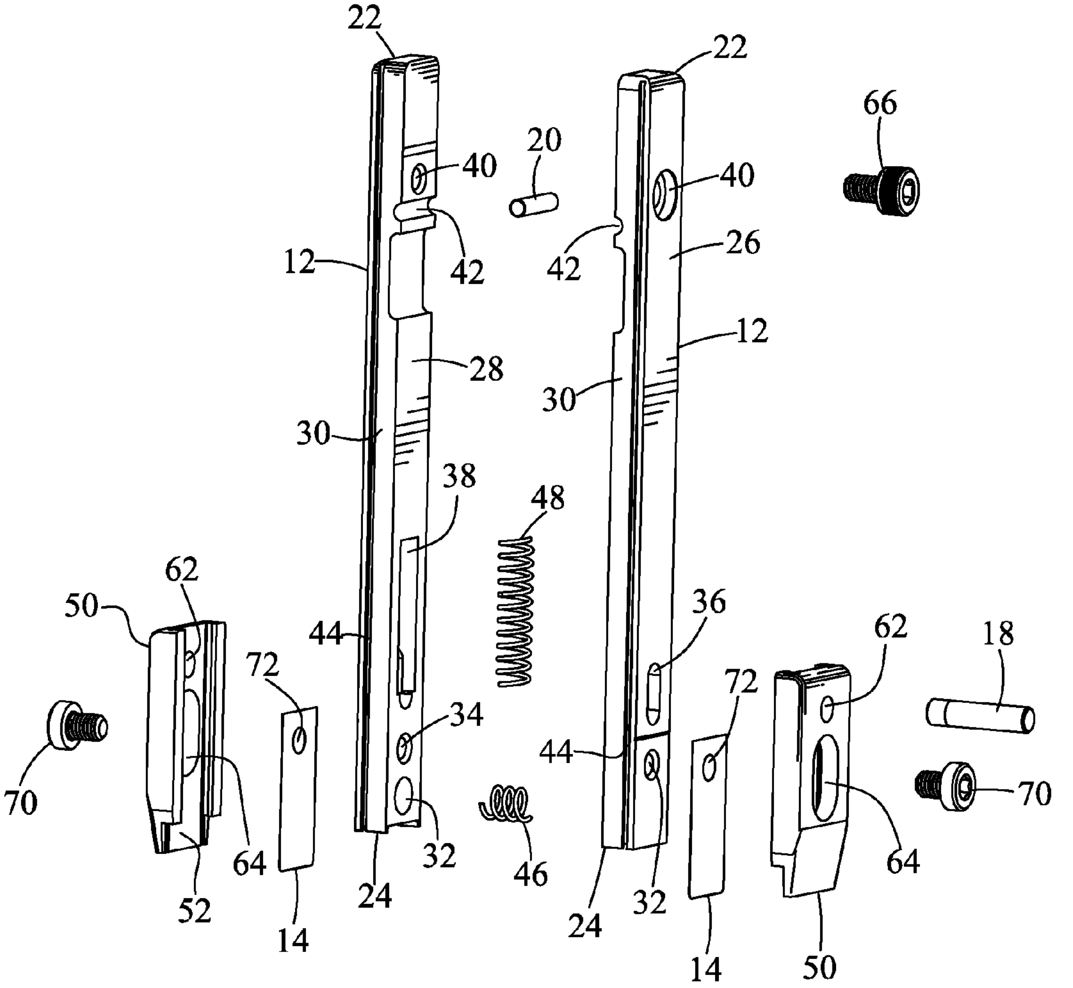
FIG. 2 is an exploded view of the clutching jig according to the present invention.
Figure 3:
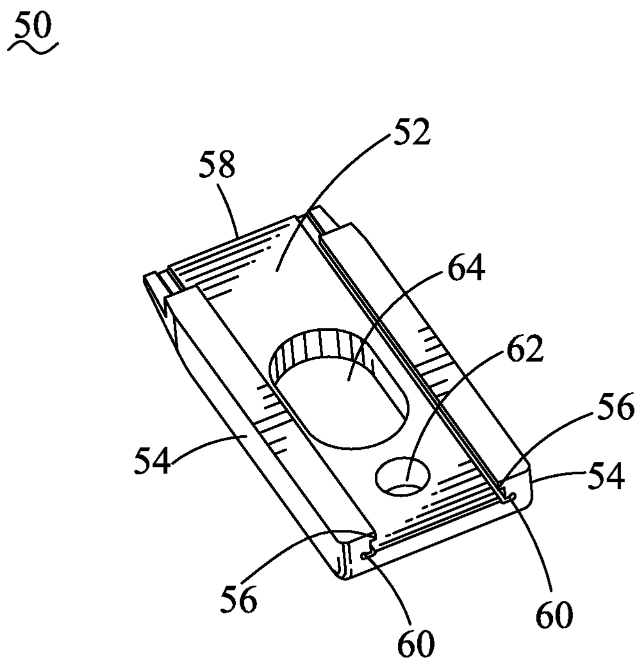
FIG. 3 is a perspective view of a protecting means of the clutching jig according to the present invention.
Figure 4:
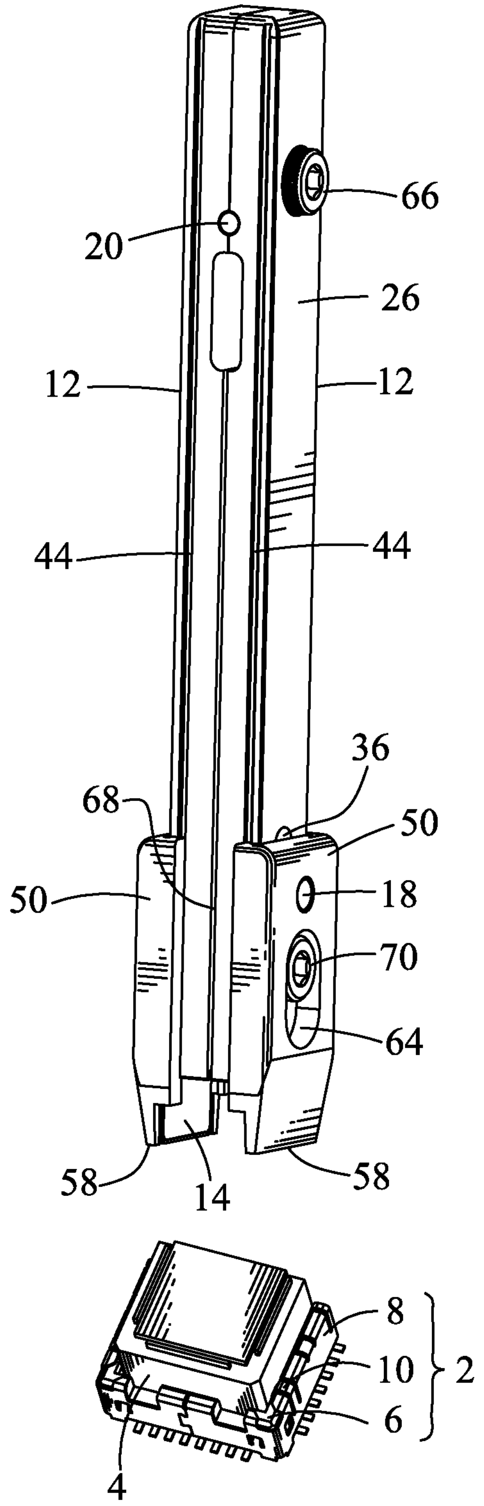
FIG. 4 is a perspective view showing the clutching jig and a lens assembly.
Figure 5:
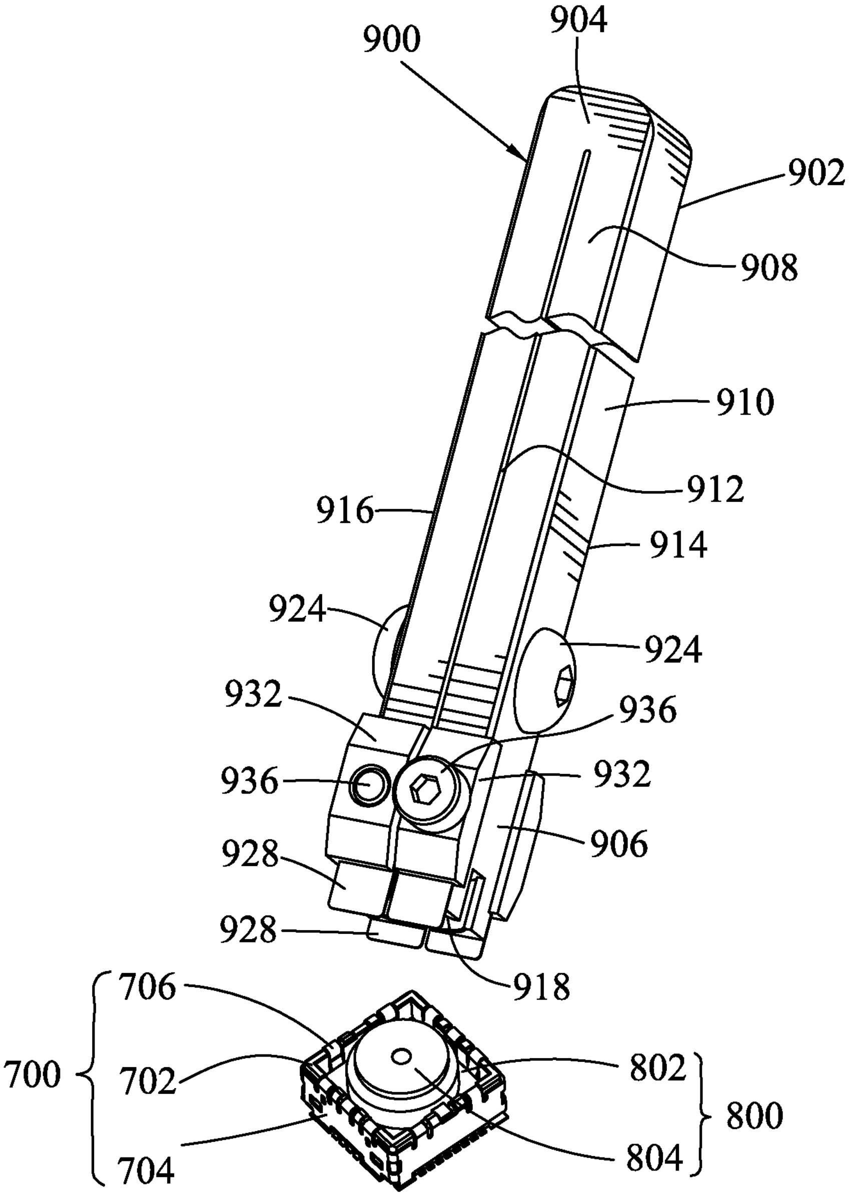
FIG. 5 (Prior Art)
FIG. 5 is a perspective view showing a conventional clutching jig and an another lens assembly.
Figure 6:
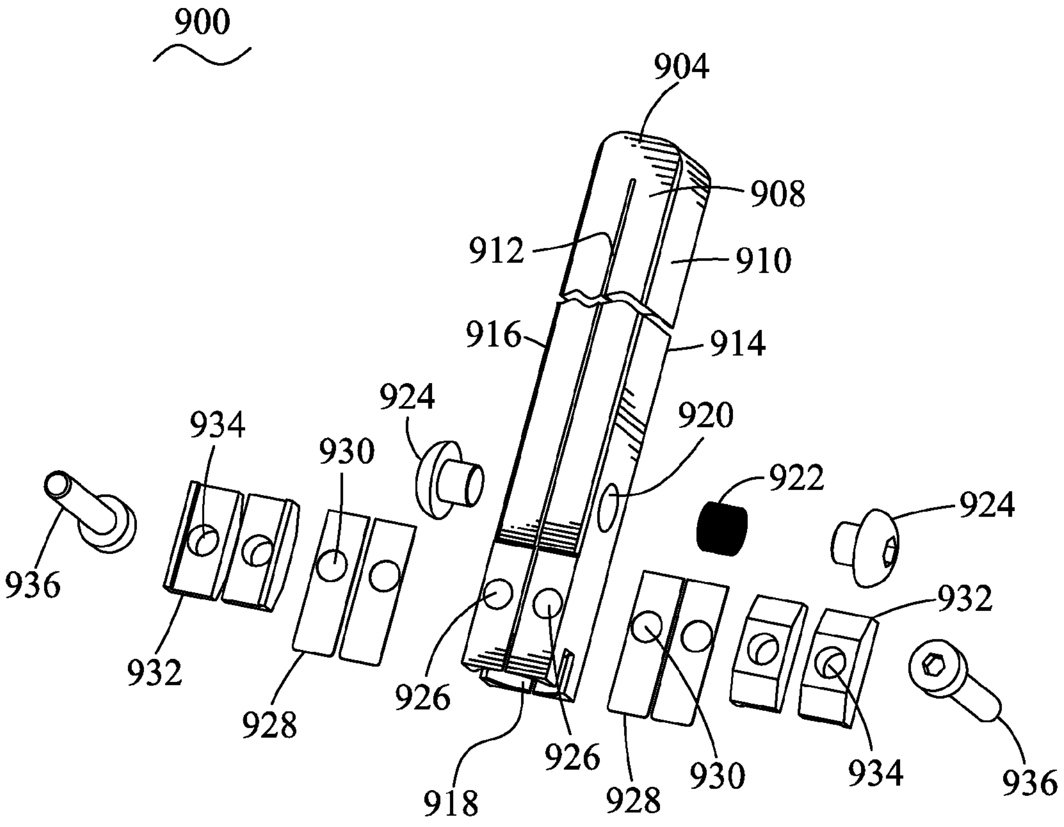
FIG. 6 (Prior Art)
FIG. 6 is an exploded view of the conventional clutching jig.

Please refer to FIG. 1 to FIG. 4. A clutching jig 1 is used to disassemble a lens assembly including a lens socket 2 and a lens module 4 mounted to the lens socket 2. The lens module 4 is of a rectangular shape. The lens socket 2 includes an insulating housing 6 and a metal shell 8. The insulating housing 6 is of a cup-shaped for receiving the lens module 4 therein. The metal shell 8 encloses the periphery of the insulating housing 6. A top of the metal shell 8 is extended a plurality of pressing pieces 10 inwardly. The pressing pieces 10 press the periphery of the lens module 4.

The clutching jig 1 includes a pair of clutching bar 12, a pair of clutching piece 14, a protecting means 16, an elastic means, a guiding bar 18 and a positioning pin 20. The clutching bars 12 are substantially the same. Each of the clutching bar 12 is of an elongate shape and includes a top end portion 22, a bottom end portion 24, an outer surface 26, an inner surface 28 and a pair of lateral surfaces 30.

The bottom end portion 24 of the clutching bar 12 defines a receiving hole 32, a first fixing hole 34 and a first guiding slot 36. The receiving hole 32 defines on the inner surface 28 of the bottom end portion 24. The first fixing hole 34 is penetrated the outer surface 26 and the inner surface 28 of the bottom end portion 24, and is above the receiving hole 32. The first guiding slot 36 is penetrated the outer surface 26 and the inner surface 28 of the bottom end portion 24, and is above the first fixing hole 34. The first guiding slot 36 is of an elongate shape and formed along a longitudinal direction of the clutching bar 12.

The inner surface 28 of the clutching bar 12 defines a receiving groove 38 above the first fixing hole 34. The receiving groove 38 is of an elongate shape and formed along the longitudinal direction of the clutching bar 12. The first guiding slot 36 is connected to a bottom portion of the receiving groove 38.

The top end portion 22 of the clutching bar 12 defines a second fixing hole 40 and a positioning groove 42 below the first fixing hole 40. The first fixing hole 40 is penetrated the outer surface 26 and the inner surface 28. The positioning groove 42 is transversely formed on the inner surface 28 of the top end portion 22. The positioning groove 42 is of a semi-cylinder shaped and penetrated the lateral surfaces 30. Each of the lateral surfaces 30 defines a first guiding slit 44 from the bottom end portion 24 to the top end portion 22. The first guiding slit 44 is adjacent to the outer surface 26.

The guiding bar 18 is of a cylinder shape. The elastic means includes a first coil spring 46 and a second coil spring 48. The protecting means 16 includes a pair of protecting blocks 50. Each of the protecting blocks 50 includes a protecting board 52, a pair of side boards 54 and a pair of guiding ribs 56. The protecting board 52 defines a thin end 58. The side boards 54 are vertically extended from the opposite sides of the protecting board 52 respectively. The guiding ribs 56 are extended inwardly from a top of the side boards 54 respectively.

A bottom portion of each of the side boards 54 defines a second guiding slit 60 extended from the thin end 58 and to the other end of the protecting board 52. The protecting board 52 defines a third fixing hole 62 and a second guiding slot 64. The second guiding slot 64 is formed along a longitudinal direction of the protecting board 52 and between the third fixing hole 62 and the thin end 58.

While the clutching jig 100 is assembled, the inner surfaces 28 of the clutching bar 12 are arranged to face to each other. The top end portions 22 of the clutching bar 12 are fixed according to a first screw 66 engaged into the second fixing holes 40. The positioning pin 20 is received in a cylindrical channel formed by the positioning grooves 42.

The first coil spring 46 is received in a first receiving space formed by the receiving holes 32. The opposite ends of the first spring 46 press inner surfaces of the receiving holes 32 respectively to urge the bottom end portions 24 of the clutching bar 12 to apart from each other. Hence, a slit 68 is formed between the bottom end portions 24.

The guiding bar 18 is inserted through the third fixing holes 62 of the protecting blocks 50 and the first guiding slots 36 of the clutching bar 12, and fixed in the third fixing holes 62. The guiding ribs 56 of each of the protecting blocks 50 are capable of respectively sliding in the first guiding slits 44 of each of the clutching bar 12. Hence, the protecting board 52 of the protecting block 50 is attached on the outer surface 26 of the clutching bar 12 and the protecting block 50 is capable of sliding relative to the clutching bar 12 along the longitudinal direction via the cooperation of the first guiding slits 44 and the guiding ribs 56.

The clutching piece 14 is positioned between the outer surface 26 of the clutching bar 12 and the protecting board 52 of the protecting block 50. The opposite sides of the clutching piece 14 are capable of sliding in the second guiding slits 60 of the protecting block 50. A second screw 70 is engaged into the first fixing hole 32 of the clutching bar 12 through the second guiding slot 64 of the protecting block 50 and a fourth fixing hole 72 of the clutching piece 14.

The second coil spring 48 is received in a second receiving space formed by the receiving grooves 38. One end of the second coil spring 48 press a top portion of the second receiving space, and the other end press the guiding bar 18. Hence, the guiding bar 18 is urged to slide to a bottom portion of the first guiding slot 36. The protecting block 50 is brought to slide downwardly to cover whole the clutching piece 14. Especially, the thin end 52 of the protecting block 50 and a bottom edge of the clutching piece 14 are at the same level.

If the clutching jig 100 is used to disassemble the lens assembly, first, thin ends 52 of protecting blocks 50 will abut against the top of the shell 8 of the lens socket 2. Second, the clutching jig 100 will be pushed towards the lens assembly. The protecting block 50 is guided via the guiding ribs slid along the first guiding slits 44 to slide upwardly relative to the clutching bar 12. The guiding bar 18 is brought by the protecting block 50 to slide to a top portion of the first guiding slot 36 and press the second coil spring 48. Hence, the clutching piece 14 is exposed outside the protecting block 50 and inserted into the lens socket 2.

The clutching piece 14 is inserted between the lens module 4 and the lens socket 2 to urge the pressing pieces 10 of the lens sockets 2 to depart from the lens module 4. At the same time, the lens module 4 is between the clutching pieces 14. Third, the clutching bars 12 are applied an external force from the outer surfaces 26 to urge the clutching bars 12 to move to each other. Hence, the clutching pieces 14 clutch the lens module 4.

Fourth, the clutching jig 100 is pulled out from the lens socket 2 with the lens module 4. At the same time, the thin end 52 of the protecting block 50 is apart from the lens socket 2. The second coil spring 48 pushes the guiding bar 18 downwardly. The protecting block 50 is brought by the guiding bar 18 to slide downwardly relative to the clutching bar 12. Hence, the clutching piece 14 is cover by the protecting block 50 again.

Last, the external force applied to the clutching bars 12 is released and the first coil spring 46 pushes the clutching bars 12 outwardly. Hence, the clutching bars 12 are returned to the original position and the lens module 4 is released from the clutching jig 100.

As describe above, the protecting blocks 50 will cover the clutching pieces 14 if the clutching jig 100 is unused. The protecting blocks 50 will slide upwardly relative to the clutching bars 12 to urge the clutching pieces 14 to be exposed if the clutching jig 100 is used to disassemble the lens assembly. The protecting blocks 50 can protect the clutching pieces 14 to prevent the clutching pieces 14 from damage.

Furthermore, the present invention is not limited to the embodiment described above; various additions, alterations and the like may be made within the scope of the present invention by a person skilled in the art. For example, respective embodiments may be appropriately combined.

What is claimed is:

1. A clutching jig, comprising:

a pair of clutching bars, each of the clutching bars comprising a top end portion and a bottom end portion, the top end portions are connected to each other, the bottom end portions are separated from each other;

a pair of clutching pieces, each of the clutching pieces fixed to the bottom end portion of each of the clutching bars; and a protecting means;

wherein the clutching pieces are covered by the protecting means and exposed from the protecting means via the protecting means moved relative to the clutching pieces;

wherein each of the clutching pieces is positioned between the bottom end portions of the protecting means;

wherein the protecting means is mounted on the clutching bars and slid relative to the clutching bars along a longitudinal direction of the clutching bars;

wherein the protecting means comprising a pair of protecting blocks, each of the protecting blocks is mounted on the bottom end portion of each of the clutching bars.

2. The clutching jig as claimed in claim 1, wherein the protecting blocks are brought together by a guiding bar to slide relative to the clutching bars.

3. The clutching jig as claimed in claim 2, wherein each of the clutching bars defines an outer surface and an inner surface, each of the protecting blocks is mounted on the outer surface of each of the clutching bars.

4. The clutching jig as claimed in claim 3, wherein each of the inner surfaces defines a receiving groove along the longitudinal direction, each of the outer surfaces defines a first guiding slot along the longitudinal direction, the receiving groove is connected to the first guiding slot, each of the protecting blocks defines a fixing hole, the guiding bar is inserted through the fixing holes of the protecting blocks, the first guiding slots and the receiving grooves, a spring is received between the receiving grooves, a top end of the spring press a top portion of each of the receiving grooves, a bottom end of the spring press the guiding bar.

5. The clutching jig as claimed in claim 4, wherein each of the outer surfaces defines a fixing hole, each of the clutching pieces defines a fixing hole, each of the protecting blocks defines a second guiding slot along the longitudinal direction, each of the clutching pieces is fixed to each of the clutching bars via a screw inserted through the second guiding slots, the fixing holes of the clutching pieces and the fixing holes of the clutching bars and engaged into the fixing holes of the clutching bars.

6. The clutching jig as claimed in claim 5, wherein each of the outer surfaces comprises a pair of first slits extended along the longitudinal direction, each of the blocks comprises a pair of guiding ribs, the guiding ribs slide into the first slits respectively.

7. The clutching jig as claimed in claim 6, wherein each of the clutching bar is of a rectangular shape, the outer surface of the clutching bar defines a pair of lateral surfaces, the first slits are formed on the lateral surfaces respectively, each of the protecting block comprising a protecting board and a pair of side boards extended from the opposite sides of the protecting board respectively, each of the guiding ribs is extended inwardly from a top of each of side boards.

8. The clutching jig as claimed in claim 7, wherein a bottom of each of the side boards defines a second slit along the longitudinal direction, the opposite sides of the clutching piece slide into the second slits respectively.

9. The clutching jig as claimed in claim 7, wherein the inner surface of the bottom end portion of the clutching bar defines a receiving hole, the receiving holes of the clutching bars together receive a spring.

10. The clutching jig as claimed in claim 9, wherein the inner surface of the top end portion of the clutching bar defines a positioning groove along a transverse direction of the clutching bar, the positioning grooves of the clutching bars together receive a positioning pin.

11. A clutching jig, comprising:

a pair of clutching bars, each of the clutching bars being of an elongate shape and comprising an inner surface, an outer surface, a pair of lateral surfaces, a top end portion and a bottom end portion, the inner surfaces of the clutching bars being faced to each other, the top end portions of the clutching bars being connected to each other, the bottom end portions of the clutching bars are separated from each other;

a clutching piece connected to the bottom end of each of the clutching bars; and a protecting block covered on the clutching piece;

wherein the clutching piece is exposed from the protecting block via the protecting block sliding relative to the clutching piece along a longitudinal direction of the clutching bar;

wherein the inner surface of the clutching bar defines a receiving groove along the longitudinal direction, the outer surface of the clutching bar defines a first guiding slot along the longitudinal direction, the first guiding slot connected to the receiving groove, the protecting block defines a fixing hole, a guiding bar inserted through the fixing holes of the protecting blocks, the first guiding slots and the receiving grooves of the clutching bars, the receiving grooves being together receiving a spring of which one end presses a top portion of each of the receiving grooves and the other end presses the guiding bar.

12. The clutching jig as claimed in claim 11, wherein the inner surface of the clutching bar defines a fixing hole below the receiving groove, the clutching piece defines a fixing hole, the protecting block defines a second guiding slot below the fixing hole of the protecting block, a fixing pin inserted through the second guiding slot of the protecting block, the fixing hole of the clutching piece and fixed into the fixing hole of the clutching bar.

13. The clutching jig as claimed in claim 12, wherein each of the lateral surfaces of the clutching bar defines a first slit, the protecting block comprises a protecting board covering on the clutching piece, a pair of side boards respectively extended from the opposite sides of the protecting board and a rib extend from a top of each of the side boards and slid into the first slit.

14. The clutching jig as claimed in claim 13, wherein a bottom of each of the side boards of the protecting block defines a second slit along the longitudinal direction, the opposite sides of the clutching piece are respectively slid into the second slits of the protecting block.

15. The clutching jig as claimed in claim 14, wherein the inner surface of the clutching bar defines a receiving hole below the fixing hole of the clutching bar, the receiving holes of the clutching bars together receive a spring.

16. The clutching jig as claimed in claim 15, wherein the inner surface of the top end portion of the clutching bar defines a positioning groove along a transverse direction of the clutching bar, the positioning grooves of the clutching bars together receive a positioning pin, the outer surface of the clutching bar defines a penetrating hole penetrating the inner surface, a fixing pin engaged into the penetrating holes of the clutching bars.

* * * * *